(12) United States Patent
Li et al.

(10) Patent No.: US 8,316,295 B2
(45) Date of Patent: Nov. 20, 2012

(54) SHARED LANGUAGE MODEL

(75) Inventors: Dong Li, Beijing (CN); Qian Xun Johnson Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 893 days.

(21) Appl. No.: 11/713,255

(22) Filed: Mar. 1, 2007

(65) Prior Publication Data

US 2008/0215307 A1    Sep. 4, 2008

(51) Int. Cl.
*G06F 17/00* (2006.01)
*G06F 17/28* (2006.01)

(52) U.S. Cl. ........ 715/263; 715/255; 715/264; 715/273; 704/5; 704/8

(58) Field of Classification Search .................. 704/277, 704/1, 10, 2, 3, 4, 5, 8, 9; 715/200, 204, 715/205, 229, 234, 249, 253, 255, 256, 263, 715/264, 273, 700, 760, 762

See application file for complete search history.

(56) References Cited

U.S. PATENT DOCUMENTS

| | | | |
|---|---|---|---|
| 5,197,810 A * | 3/1993 | Zhang et al. | 400/110 |
| 6,073,146 A * | 6/2000 | Chen | 715/264 |
| 6,765,504 B2 * | 7/2004 | Ouyang | 715/262 |
| 6,809,725 B1 * | 10/2004 | Zhang | 345/171 |
| 6,822,585 B1 | 11/2004 | Ni et al. | 341/28 |
| 7,257,528 B1 | 8/2007 | Ritchie et al. | |
| 7,263,658 B2 * | 8/2007 | Chou | 715/262 |
| 7,478,033 B2 * | 1/2009 | Wu et al. | 704/2 |
| 7,861,164 B2 * | 12/2010 | Qin | 715/264 |
| 2002/0040866 A1 * | 4/2002 | Tuneld et al. | 209/546 |
| 2003/0059115 A1 * | 3/2003 | Nakagawa | 382/197 |
| 2004/0230908 A1 | 11/2004 | Atkin et al. | 715/535 |
| 2005/0027534 A1 * | 2/2005 | Meurs et al. | 704/270 |
| 2005/0049861 A1 * | 3/2005 | Sugano | 704/231 |
| 2006/0007157 A1 | 1/2006 | Li et al. | 345/168 |
| 2006/0018545 A1 | 1/2006 | Zhang et al. | 382/185 |
| 2006/0061491 A1 * | 3/2006 | Qin | 341/28 |
| 2006/0074629 A1 | 4/2006 | Chiu et al. | 704/8 |
| 2006/0095843 A1 * | 5/2006 | Chou | 715/535 |
| 2006/0204100 A1 * | 9/2006 | Dunn | 382/185 |
| 2006/0241933 A1 * | 10/2006 | Franz | 704/2 |

(Continued)

FOREIGN PATENT DOCUMENTS

CN    1060544 A    4/1992

(Continued)

OTHER PUBLICATIONS

U.S. Office Action dated Mar. 29, 2010 cited in U.S. Appl. No. 11/713,256.

(Continued)

*Primary Examiner* — Maikhanh Nguyen

(74) *Attorney, Agent, or Firm* — Merchant & Gould

(57) ABSTRACT

A shared language model may be provided. First, a first input may be received. Then, in response to the first input, an input mode may be determined comprising one of the following: a pinyin input mode, a stroke order input mode, and a stroke number input mode. Then, data may be received based on the determined input mode. The received data may be converted using the determined input mode and using a language model. The language model may be configured to be used with each of the following input modes: the pinyin input mode, the stroke order input mode, and the stroke number input mode.

17 Claims, 4 Drawing Sheets

U.S. PATENT DOCUMENTS

| | | | | |
|---|---|---|---|---|
| 2006/0282583 | A1 | 12/2006 | Kung et al. | 710/67 |
| 2007/0110222 | A1* | 5/2007 | Kim | 379/355.07 |
| 2008/0211777 | A1 | 9/2008 | Li et al. | |
| 2008/0215308 | A1 | 9/2008 | Li et al. | |
| 2008/0297480 | A1* | 12/2008 | Lee | 345/169 |
| 2010/0146386 | A1* | 6/2010 | Ma et al. | 715/261 |

FOREIGN PATENT DOCUMENTS

| | | |
|---|---|---|
| JP | 5-282294 A | 10/1993 |
| JP | 8-096081 A | 4/1996 |
| JP | 8-180050 A | 7/1996 |

OTHER PUBLICATIONS

NPL Reference U—"Chinese Character Dictionary: Bushou Index." Copyright Date: 1994. http://www.chinalanguage.com\dictionaries.

U.S. Office Action dated Jun. 22, 2010 cited in U.S. Appl. No. 11/713,303.

Tague Griffith, "Seamonkey Input Method Specification," pp. 1-10, Aug. 29, 2006, http://www.mozilla.org/projects/intl/input-method-spec.html.

"How to Input Chinese in English Windows," pp. 1-9, 2005, http://www.newconcept.com/Reference/how_input_chinese.html.

Marshall C. Ramsey et al., "Multilingual Input System for the Web—an Open Multimedia Approach of Keyboard and Handwriting Recognition for Chinese and Japanese," 7 pgs., http://ieeexplore.ieee.org/ie14/5492/14771/00670394.pdf?isNumber=.

U.S. Final Office Action dated Oct. 28, 2010 cited in U.S. Appl. No. 11/713,303.

U.S. Final Office Action dated Jul. 19, 2010 cited in U.S. Appl. No. 11/713,256.

Chinese First Office Action dated Dec. 9, 2010 cited in Application No. 200880006682.X.

U.S. Office Action dated Jan. 6, 2011 cited in U.S. Appl. No. 11/713,256.

Chinese First Office Action dated Jan. 26, 2011 cited in Application No. 200880006684.9.

U.S. Final Office Action dated Jun. 21, 2011 cited in U.S. Appl. No. 11/713,256.

Chinese First Office Action dated Jan. 31, 2011 cited in Application No. 200880006740.9.

U.S. Office Action dated Mar. 17, 2011 cited in U.S. Appl. No. 11/713,303.

Chinese Second Office Action dated Oct. 20, 2011 cited in Appl. No. 200880006740.9.

Chinese Second Office Action dated Dec. 21, 2011 cited in Appl. No. 200880006684.9, 6 pgs.

U.S. Office Action dated Sep. 2, 2011 cited in U.S. Appl. No. 11/713,303.

Chinese Second Office Action dated Jan. 31, 2012 cited in Appl. No. 200880006682.X, 12 pgs.

U.S. Final Office Action dated Feb. 28, 2012 cited in U.S. Appl. No. 11/713,303, 23 pgs.

Chinese Third Office Action dated Jun. 20, 2012 cited in Appl. No. 200880006684.9, 14 pgs.

U.S. Final Office Action dated Jul. 19, 2012 cited in U.S. Appl. No. 11/713,256, 29 pgs.

* cited by examiner

SHARED LANGUAGE MODEL

RELATED APPLICATIONS

Related U.S. patent application Ser. No. 11/713,303, filed on Mar. 1, 2007 and entitled "Integrated Pinyin and Stroke Input," assigned to the assignee of the present application and related U.S. patent application Ser. No. 11/713,256, filed on Mar. 1, 2007 and entitled "Stroke Number Input," assigned to the assignee of the present application are both hereby incorporated by reference.

BACKGROUND

A Chinese character is a logogram used in writing Chinese. A complete writing system in Chinese characters appeared in China 3200 years ago during the Shang dynasty, making it what is believed to be the oldest "surviving" writing system. Because the logograms used in writing Chinese are predominantly pictographs, the linkages to the modern Chinese writing system may be decipherable by linguistic archaeologists. Consequently, because thousands of different logograms are used in Chinese, it is difficult to enter Chinese using a computer keyboard.

Once way to represent Chinese characters is to use a "Pinyin" (where "pin" means "spell" and "yin" means "sound"). Pinyin is a way to represent Chinese characters and express the sounds in the Chinese language using the Roman alphabet. There are other systems to express Mandarin Chinese, but pinyin is the most accepted and widely used. Once learned, a person who has learned pinyin will know how to pronounce any word in Mandarin using a Chinese dictionary. Pinyin is also the most common way to input Chinese characters into a computer. Although pinyin and English both use the Roman alphabet, many letters are not expressed with the same sounds that English uses.

Furthermore, words expressed in pinyin use a set of 21 sounds representing the beginning of the word called initials, and a set of 37 sounds representing the end of the word called finals. These combine to form about 420 different sounds. For example, the word for "Flower" expressed in pinyin is "huā". In this word, the letter "h" is the initial and "uā" is the final. In addition, words are often combined to form compound words. For example, the word for "China" expressed in pinyin is "zhōngguó". Zhōng means middle (initial: "zh", final: " ōng") and guó means country (initial: "g", final: "uó").

Moreover, words in Mandarin that have the same pronunciation can have different meanings depending on how the word is said. The "tone" of a word in Chinese describes how the pitch of the speaker's voice changes as the word is said. There are four "tones" in Mandarin. The tones are represented in pinyin by marks above the words.

On a conventional computer with a QWERTY keyboard, there may only be phonetic or pinyin input processes for Chinese input. With conventional pinyin input processes, however, users have no way to input Chinese characters if they don't know the pinyin or if there is no pinyin assigned to a specific Chinese character.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A shared language model may be provided. First, a first input may be received. Then, in response to the first input, an input mode may be determined comprising one of the following: a pinyin input mode, a stroke order input mode, and a stroke number input mode. Then, data may be received based on the determined input mode. The received data may be converted using the determined input mode and using a language model. The language model may be configured to be used with each of the following input modes: the pinyin input mode, the stroke order input mode, and the stroke number input mode.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
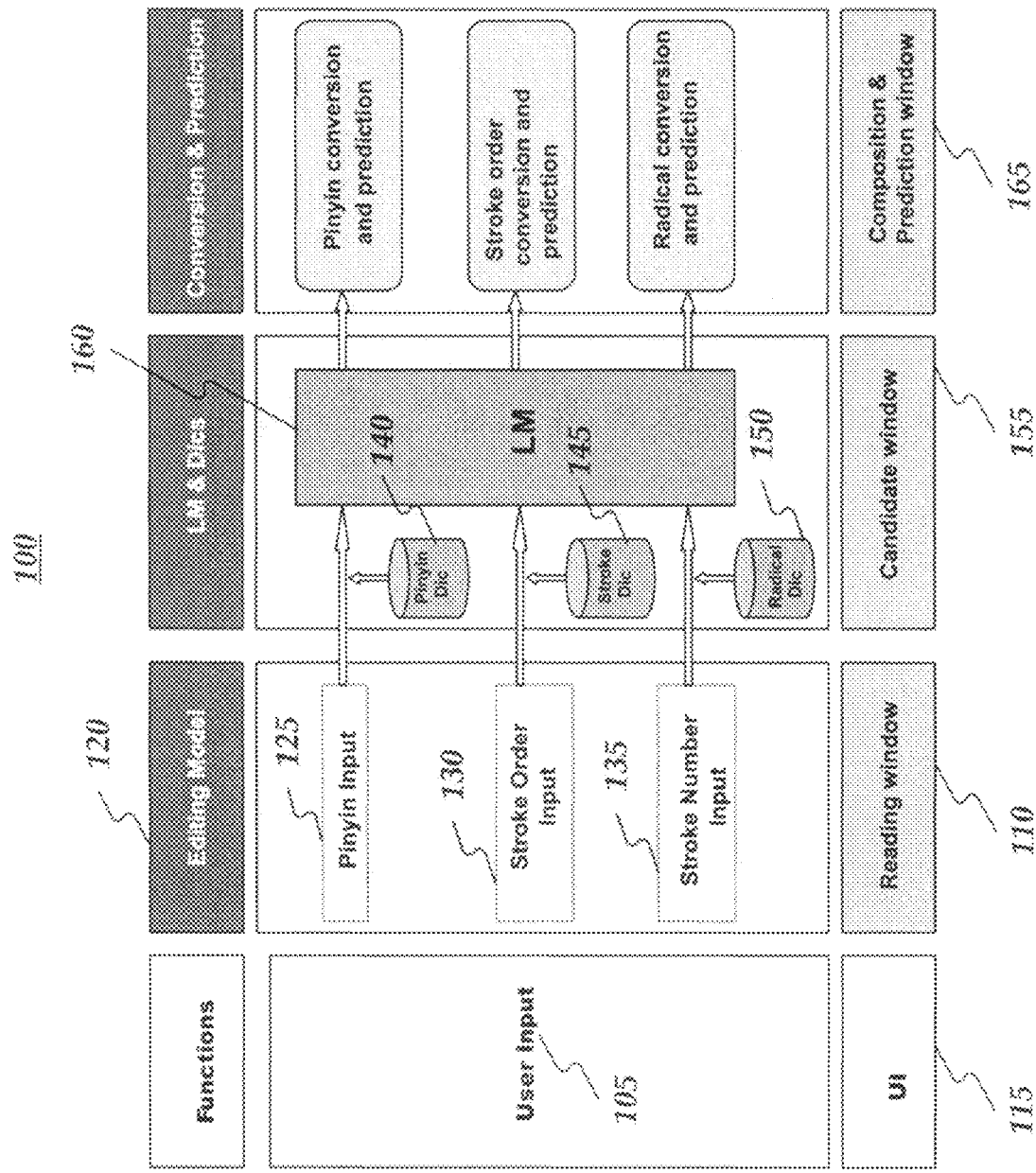
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A shared language model may be provided. Conventional systems using a desktop or laptop computer with a QWERTY keyboard support only phonetic or pinyin input processes, for example, for Chinese. One problem with a conventional pinyin input process is that users may have no way to input Chinese characters if the users do not know the pinyin for a desired Chinese character or if there is no pinyin assigned to the desired Chinese character. Consistent with embodiments of the invention, stroke-based input processes (e.g. stroke order and stroke number input processes) may solve this pinyin input process problem. For example, logograms (e.g. Chinese characters) may comprise a radical part and remaining strokes. The radical part comprises strokes as well. As described in more detail below, with stroke-based input processes, users may input, for example, Chinese characters without knowing the characters pronunciations. Furthermore, using a language model (LM), embodiments of the invention may provide users with higher conversion accuracy.

Consistent with embodiments of the present invention, FIG. 1 illustrates an exemplary operating environment for an integrated pinyin and stroke input system 100. User input 105 may be entered by a user into a reading window 110 of a user interface 115. User input 105 may indicate which editing model 120 the user wishes to invoke and data corresponding to a logogram (e.g. Chinese character). For example, the user may provide input 105 indicating a desire to use a pinyin input model 125, a stroke order input model 130, or a stroke number input model 135. The data corresponding to the logogram may be sent to the desired editing model 120 that in turn may use a dictionary (e.g. a pinyin dictionary 140, a stroke dictionary 145, or a radical dictionary 150). The desired editing model 120 may use the data corresponding to the logogram to produce a plurality of logogram candidates in a candidate window 155 associated with user interface 115. Furthermore, a LM 160 may be used to provide the user with higher conversion accuracy. For example, LM 160 may be used to predict a logogram by use frequency or based on a preceding logogram. LM 160 may be shared between pinyin input model 125, stroke order input model 130, and stroke number input model 135. The plurality of logogram candidates may be improved by LM 160 and placed in a composition and prediction window 165.

Figure 2:
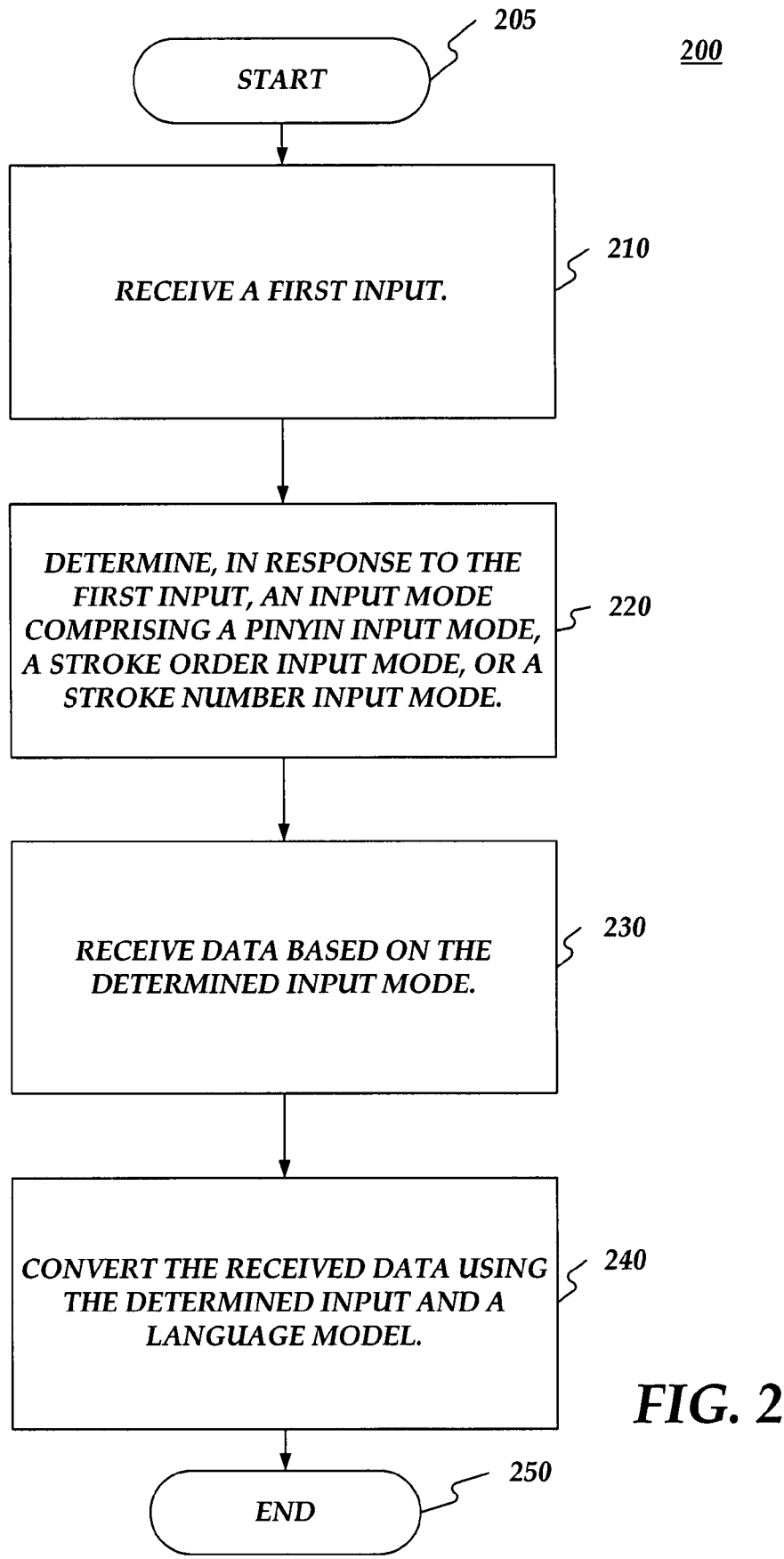
FIG. 2 is a flow chart of a method for providing a shared language model.

FIG. 2 is a flow chart setting forth the general stages involved in a method 200 consistent with an embodiment of the invention for providing a shared language model. Method 200 may be implemented using a computing device 100 as described in more detail below with respect to FIG. 1. Ways to implement the stages of method 200 will be described in greater detail below. Method 200 may begin at starting block 205 and proceed to stage 210 where computing device 100 may receive a first input. For example, a user may enter the first input into computing device 400 using a keyboard. The input may include a key sequence corresponding, for example, to a pinyin input mode, a stroke order input mode, or a stroke number input mode. Moreover, the first input may be received in response to the user selecting an item from a menu with a mouse. Items in the menu may correspond to the pinyin input mode, the stroke order input mode, and the stroke number input mode. As described above, embodiments of the invention may support both a leading key via keyboard input process, a menu item selection via mouse input process, or any other type input process. In addition, the first input may include data corresponding to a logogram the user wishes to enter into computing device 400. While embodiments of the invention are described in the context of Chinese characters, any logogram based language may be used and the invention in not limited to Chinese.

From stage 210, where computing device 100 receives the first input, method 200 may advance to stage 220 where computing device 100 may determine, in response to the first input, an input mode. The input mode, for example, may comprise the pinyin input mode, the stroke order input mode, or the stroke number input mode. For example, computing device may parse the first input to determine if the first input includes a key sequence corresponding to the pinyin input mode. A "control p" in the first input may indicate the user's desire to invoke the pinyin input mode. Furthermore, computing device may parse the first input to determine if the first input includes a key sequence corresponding to the stroke order input mode. A "control so" in the first input may indicate the user's desire to invoke the stroke order input mode. Moreover, computing device may parse the first input to determine if the first input includes a key sequence corresponding to the stroke number input mode. A "control sn" in the first input may indicate the user's desire to invoke the stroke number input mode.

Once computing device 100 determines the input mode in stage 220, method 200 may continue to stage 230 where computing device 100 may receive data based on the determined input mode. For example, in addition to the key sequence corresponding to a user desired mode as described above, the first input may include data corresponding to a logogram the user wishes to enter into computing device 400. The type of data accepted and the way that it is accepted may depend on the user indicated mode as described above with respect to stage 210.

After computing device 100 receives the data in stage 230, method 200 may proceed to stage 240 where computing device 100 may convert the received data. Computing device 100 may use the determined input mode and language model 160 to convert the received data. The language model, for example, may be configured to be used with each of the following input modes: the pinyin input mode, the stroke order input mode, and the stroke number input mode as will be explained in more detail below.

Figure 3:
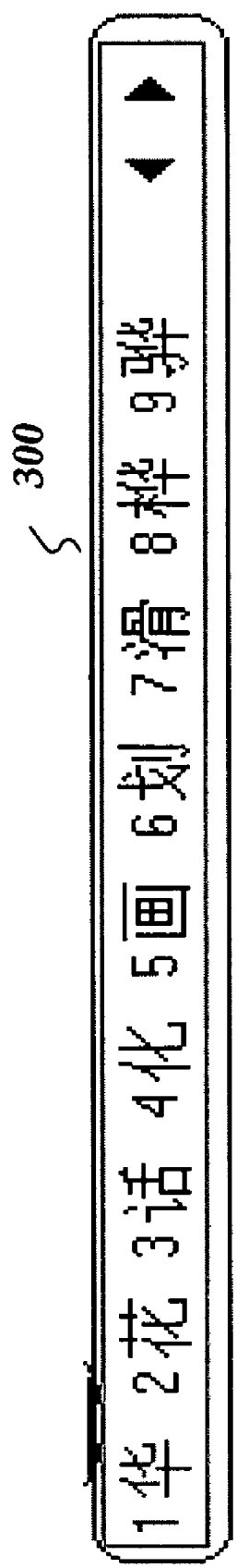
FIG. 3 is a diagram illustrating candidate window.

Regarding the pinyin input mode, as stated above, pinyin is a Chinese phonetic system that may be input as Roman letters. For example, "hua" is the pinyin for at least the following Chinese characters "花", "华", and "话". For example, when the user inputs "hua" into device 400, a plurality of Chinese characters (e.g. including the aforementioned Chinese characters) may be presented by device 400 in a candidate window 300 as shown in FIG. 3. The user may then select a desired one of plurality of Chinese characters from candidate window 300.

With respect to the stroke order input mode, for example, each Chinese character may be written stroke-by-stroke in an order. Strokes used in Chinese may include five basic strokes, for example, "—", "丨", "丿", "丶", and "一". These strokes may be assigned corresponding key board encodings, for example, 1, 2, 3, 4 and 5 respectively. Consequently, with stroke order input, the Chinese character "花" may result from the first input including the sequence "1223235."

Regarding the stroke number input mode, each Chinese character may comprise a radical part and remaining strokes. The radical part may comprise strokes as well. Consistent with embodiments of the invention, stroke number input may be based on a dictionary lookup. Chinese characters may be looked-up in a dictionary based on the radical part first, and then based on the remaining strokes other than the radical. Consequently, Chinese characters may be input in the stroke number input mode in at least two ways: i) total stroke number input (may produce a longer candidate list); and ii) radical and stroke number input (may produce a shorter candidate list).

With the total stroke number input, the total stroke number of a Chinese character may be counted by the user. Then, the user may input the stroke number in device 400 to produce a list of Chinese characters having the number of strokes. For example, "花" has a total stroke number of 7. As a result, the user may input 7 in device 400. Accordingly, device 400 may display a candidate window of Chinese characters each having 7 strokes.

With the radical and stroke number input the user may count and input a stroke number corresponding to the radical part to find the right radical from a radical candidate list. Then the user may count and input the number of remaining strokes and select the right Chinese character from the candidate list. For example, with "花", the radical is "艹". In addition, the remaining strokes are "丿", "丨", "一", and "丿" (e.g. "丿"+"丨"=>"亻" and "丿"+"一"=>"匕"). The stroke number of "艹" may be 3 and the remaining strokes may be 4. Accordingly, the user may input 3 into device 400 to find the radical "艹" from the radical candidate list. The user may then continue to input the remaining stroke number 4 to find the right Chinese character as a whole.

As stated above, in addition to using the determined input mode, computing device 100 may use language model 160 to convert the received data. The same language model (e.g. LM 160) may be used in all input modes (e.g. the pinyin input mode, the stroke order input mode, and the stroke number input mode). In other words, consistent with embodiments of the invention, all input modes may share the same language model. Furthermore, LM 160 may be used in at least two ways, in: i) intelligent conversion mode; and in ii) input prediction.

Regarding intelligent conversion, LM 160 may comprise a language statistics knowledge system based on a large scale language use. Given the user input, LM 160 can help give the most possible conversions considering, for example, a word's use frequency and the input context. For example, as shown in FIG. 3, device 400 may produce candidates 1 through 9 in response to the user providing the first input. Furthermore, using LM 160, device 400 may rank candidates 1 through 9 in window 300 by their use frequency in a given language (e.g. Chinese). In other words, with respect to candidates 1 through 9, candidate 1 may be the most frequently used character and candidate 9 may be the least frequently used. Candidates 2-8 may respectively fall in use frequency between candidates 1 and 9.

With respect to input prediction, based on what the user has already input (e.g. a preceding character), input prediction may help give the most possible Chinese characters or words that the user may input next. The prediction can be based on existing dictionaries (e.g. pinyin dictionary 140, stroke dictionary 145, and radical dictionary 150) and also on recent input history/contents. For example, "北" may have already been input by the user. Consequently, using LM 160 with input prediction, "京" may be predicted as the next most probable character because "北京" is a frequently used word in the corresponding language. In other words, "京" may be produced as a candidate (among other candidates for example). Accordingly, "京" may be given the highest rank in a candidate window (e.g. with respect to the other candidates in the candidate window) because device 400, using LM 160 with input prediction, may have determined that "京" is the most possible character that the user may input after "北". Furthermore, embodiments of the invention may provide "京" after "北" to display "北京"to the user without placing 京in a candidate window and having user select 京from the candidate window. Consistent with embodiments of the invention, it may not matter if "北" is input in the pinyin mode or either stroke input modes, "京" can be predicted because all modes may share LM 160. Once computing device 100 converts the received data in stage 240, method 200 may then end at stage 250.

An embodiment consistent with the invention may comprise a system for providing conversion. The system may comprise a memory storage and a processing unit coupled to the memory storage. The processing unit may be operative to receive a first input and to determine, in response to the first input, an input mode comprising one of the following: a pinyin input mode, a stroke order input mode, and a stroke number input mode. The processing unit may be operative to receive data based on the determined input mode. Furthermore, The processing unit may be operative to convert the received data comprising using the determined input mode and using a language model configured to be used with each of the following input modes: the pinyin input mode, the stroke order input mode, and the stroke number input mode.

Another embodiment consistent with the invention may comprise a system for providing conversion. The system may comprise a memory storage and a processing unit coupled to the memory storage. The processing unit may be operative to determine an input mode comprising one of the following: a stroke order input mode and a stroke number input mode. Furthermore, the processing unit may be operative to receive data based on the determined input mode. Moreover, the processing unit may be operative to convert the received data based upon the determined input mode and a language model configured to be used with each of the following input modes: the pinyin input mode, the stroke order input mode, and the stroke number input mode.

Yet another embodiment consistent with the invention may comprise a system for providing conversion. The system may comprise a memory storage and a processing unit coupled to the memory storage. The processing unit may be operative to receive a selection of a first conversion mode from the following: a pinyin input mode, a stroke order input mode, and a stroke number input mode. The processing unit may be further operative to convert a first data based upon the first conversion mode and a language model. Moreover, the processing unit may be operative to receive a selection of a second conversion mode being different from the first conversion mode and being selected from the following: a pinyin input mode, a stroke order input mode, and a stroke number input mode. In addition, the processing unit may be operative to convert a second data based upon the second conversion mode and the language model.

Figure 4:
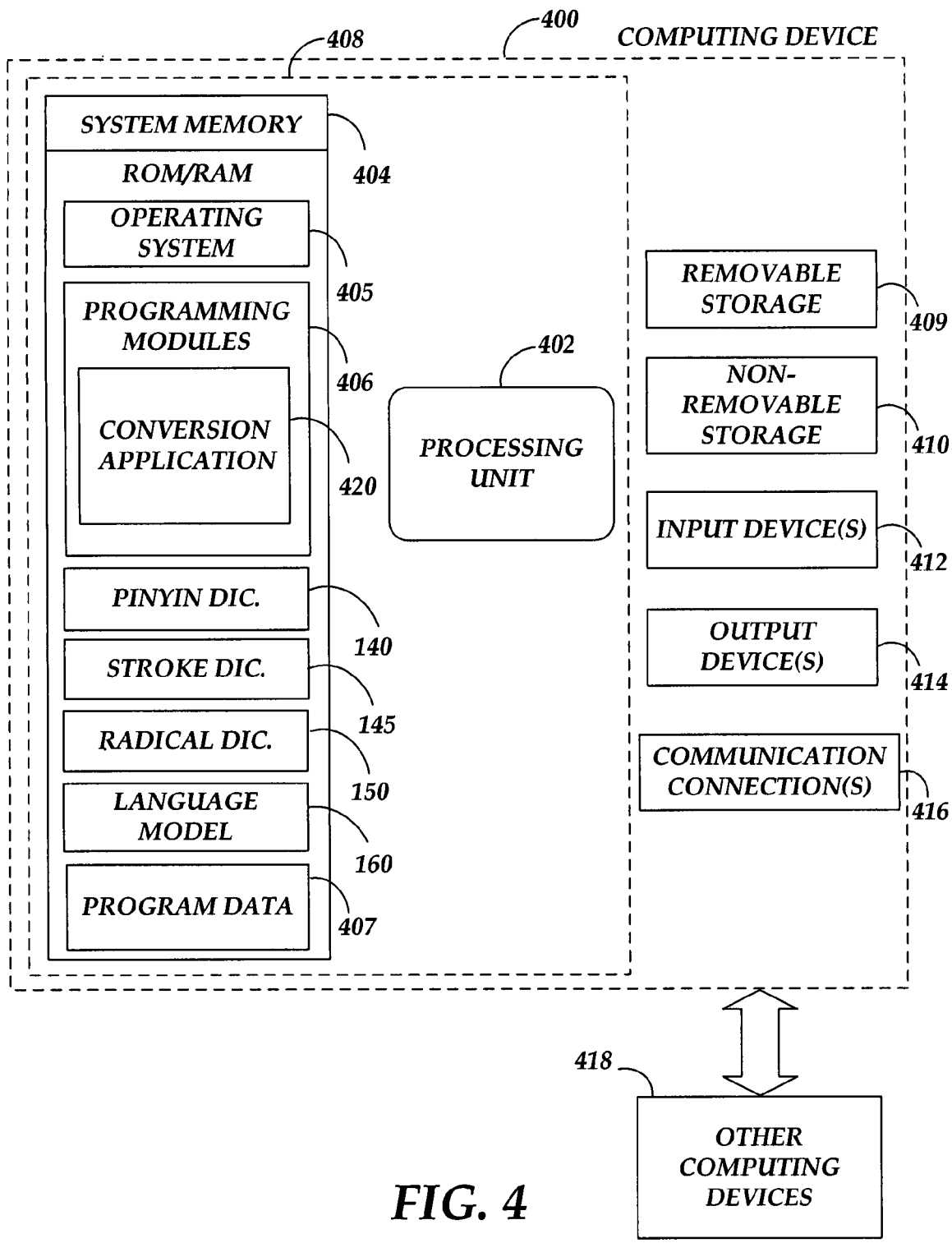
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above with respect to FIG. 1. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include pinyin dictionary 140, stroke dictionary 145, radical dictionary 150, language model 160, and a program data 407. Operating system 405, for example, may be suitable for controlling computing device 400's operation. In one embodiment, programming modules 406 may include, for example a conversion application 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. conversion application 420) may perform processes including, for example, one or more method 200's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing conversion, the method comprising:
   receiving an input;
   determining, in response to the input, an input mode comprising one of the following: a pinyin input mode, a stroke order input mode, and a stroke number input mode;
   receiving data based on the determined input mode; and
   converting the received data, wherein converting the received data comprises:
      using the determined input mode, and
      using a language model configured to be used with each of the following input modes: the pinyin input mode, the stroke order input mode, and the stroke number input mode, wherein using the language model comprises using a preceding logogram to assist in converting the received data, the language model employing the preceding logogram to provide predictions for converting the received data, the predictions being presented to a user prior to the user entering the input,
   wherein, when the determined input mode comprises the stroke number input mode, converting the received data comprises:
      displaying a plurality of logograms each having a radical corresponding to a received first integer in the data and a number of strokes other than the radical equal to a received second integer in the data wherein using the language model comprises using the language model to arrange the plurality of logograms in an order from most frequently used in a language to least frequently used in the language; and
      receiving a selection of a one of the plurality of logograms.

2. The method of claim 1, wherein receiving the input comprises receiving the input comprising a user initiated keyboard sequence.

3. The method of claim 1, wherein receiving the data based on the determined input mode comprises receiving, when the determined input mode comprises the pinyin input mode, the data comprising a plurality of roman letters corresponding to a Chinese pinyin.

4. The method of claim 1, wherein receiving the data based on the determined input mode comprises receiving, when the determined input mode comprises the stroke order input mode, the data comprising a plurality of Arabic numbers each one of the plurality of Arabic numbers corresponding to one of a plurality of a basic strokes associated with a logogram based writing system.

5. The method of claim 1, wherein receiving the data based on the determined input mode comprises receiving, when the determined input mode comprises the stroke order input mode, the data comprising a plurality of Arabic numbers each one of the plurality of Arabic numbers corresponding to one of a plurality of a basic Chinese strokes comprising the following: '—','丨','丿','丶',and "→".

6. The method of claim 1, wherein receiving the data based on the determined input mode comprises receiving, when the determined input mode comprises the stroke number input mode, the data comprising an integer corresponding to a number of strokes in a logogram.

7. The method of claim 1, wherein receiving the data based on the determined input mode comprises receiving, when the determined input mode comprises the stroke number input mode, the data comprising an integer corresponding to a number of strokes in a logogram comprising a Chinese character.

8. The method of claim 1, wherein receiving the data based on the determined input mode comprises, when the determined input mode comprises the stroke number input mode, receiving the data comprising a first integer corresponding to a radical associated with a logogram character and a second integer corresponding to a number of strokes in the logogram other than the radical.

9. The method of claim 1, wherein receiving the data based on the determined input mode comprises, when the determined input mode comprises the stroke number input mode, receiving the data comprising a first integer corresponding to a radical associated with a logogram character and a second integer corresponding to a number of strokes in the logogram other than the radical, the logogram comprising a Chinese character.

10. The method of claim 1, wherein, when the determined input mode comprises the pinyin input mode, converting the received data comprises:
    displaying a plurality of logograms corresponding to a Chinese pinyin wherein using the language model comprises using the language model to arrange the plurality of logograms in an order from most frequently used in a language to least frequently used in the language; and
    receiving a selection of a one of the plurality of logograms.

11. The method of claim 1, further comprising receiving the preceding logogram before receiving the data, wherein, when the determined input mode comprises the pinyin input mode, converting the received data comprises:
    displaying a plurality of logograms corresponding to a Chinese pinyin wherein using the language model comprises using the language model to arrange the plurality of logograms in an order from most frequently used to follow the preceding logogram in a language to least frequently used to follow the preceding logogram in the language; and receiving a selection of a one of the plurality of logograms.

12. The method of claim 1, wherein, when the determined input mode comprises the stroke number input mode, converting the received data comprises:

displaying a plurality of logograms each having a number of strokes equal to a received integer in the data wherein using the language model comprises using the language model to arrange the plurality of logograms in an order from most frequently used in a language to least frequently used in the language; and receiving a selection of a one of the plurality of logograms.

13. The method of claim 1, further comprising receiving the preceding logogram before receiving the data, wherein, when the determined input mode comprises the stroke number input mode, converting the received data comprises:

displaying a plurality of logograms each having a number of strokes equal to a received integer in the data wherein using the language model comprises using the language model to arrange the plurality of logograms in an order from most frequently used to follow the preceding logogram in a language to least frequently used to follow the preceding logogram in the language; and receiving a selection of a one of the plurality of logograms.

14. The method of claim 1, wherein, when the determined input mode comprises the stroke number input mode, converting the received data comprises:

displaying a plurality of logograms each having a radical corresponding to a received first integer in the data and a number of strokes other than the radical equal to a received second integer in the data wherein using the language model comprises using the language model to arrange the plurality of logograms in an order from most frequently used to follow the preceding logogram in a language to least frequently used to follow the preceding logogram in the language; and receiving a selection of a one of the plurality of logograms.

15. A system for providing conversion, the system comprising:
a memory storage; and
a processing unit coupled to the memory storage, wherein the processing unit is operative to:
determine an input mode comprising one of the following: a pinyin input mode, a stroke order input mode and a stroke number input mode;
receive data based on the determined input mode; and
convert the received data based upon the determined input mode and a language model, wherein the language model is configured to:
be used with each of the following input modes: the pinyin input mode, the stroke order input mode, and the stroke number input mode, and
use a context of the received data to assist in the conversion of the received data by tracking previously converted logograms and using the previously converted logograms to make predictions for the conversion of the received data, wherein the language model makes predictions for the conversion of the received data based on the preceding logogram by providing a listing of logograms that frequently follow the preceding logogram prior to entering the data as an input,
wherein the processing unit being operative to convert the received data based upon the determined input mode comprises the processing unit being operative to:
display a plurality of logograms each having a radical corresponding to a received first integer in the data and a number of strokes other than the radical equal to a received second integer in the data wherein using the language model comprises using the language model to arrange the plurality of logograms in an order from most frequently used to follow the preceding logogram in a language to least frequently used to follow the preceding logogram in the language; and
receive a selection of a one of the plurality of logograms.

16. The system of claim 15, wherein the processing unit being operative to convert the received data based upon the determined input mode comprises the processing unit being operative to create a Chinese character based on strokes indicated by a plurality of Arabic numbers in the received data and an order of the plurality of Arabic numbers in the received data, each one of the strokes indicated by the received plurality of Arabic numbers comprising Chinese strokes selected from the following: "一", "丨", "丿", "丶", and "㇀".

17. The system of claim 15, wherein the processing unit being operative to convert the received data based upon the determined input mode comprises the processing unit being operative to:
display a plurality of logograms each having a number of strokes equal to a received integer in the data wherein using the language model comprises using the language model to arrange the plurality of logograms in an order from most frequently used in a language to least frequently used in the language; and
receive a selection of a one of the plurality of logograms.

* * * * *